June 13, 1933.　　　　L. R. TOWER　　　　1,914,000
CONTROL FLAP AND BALANCE
Filed Aug. 18, 1931　　　3 Sheets-Sheet 1
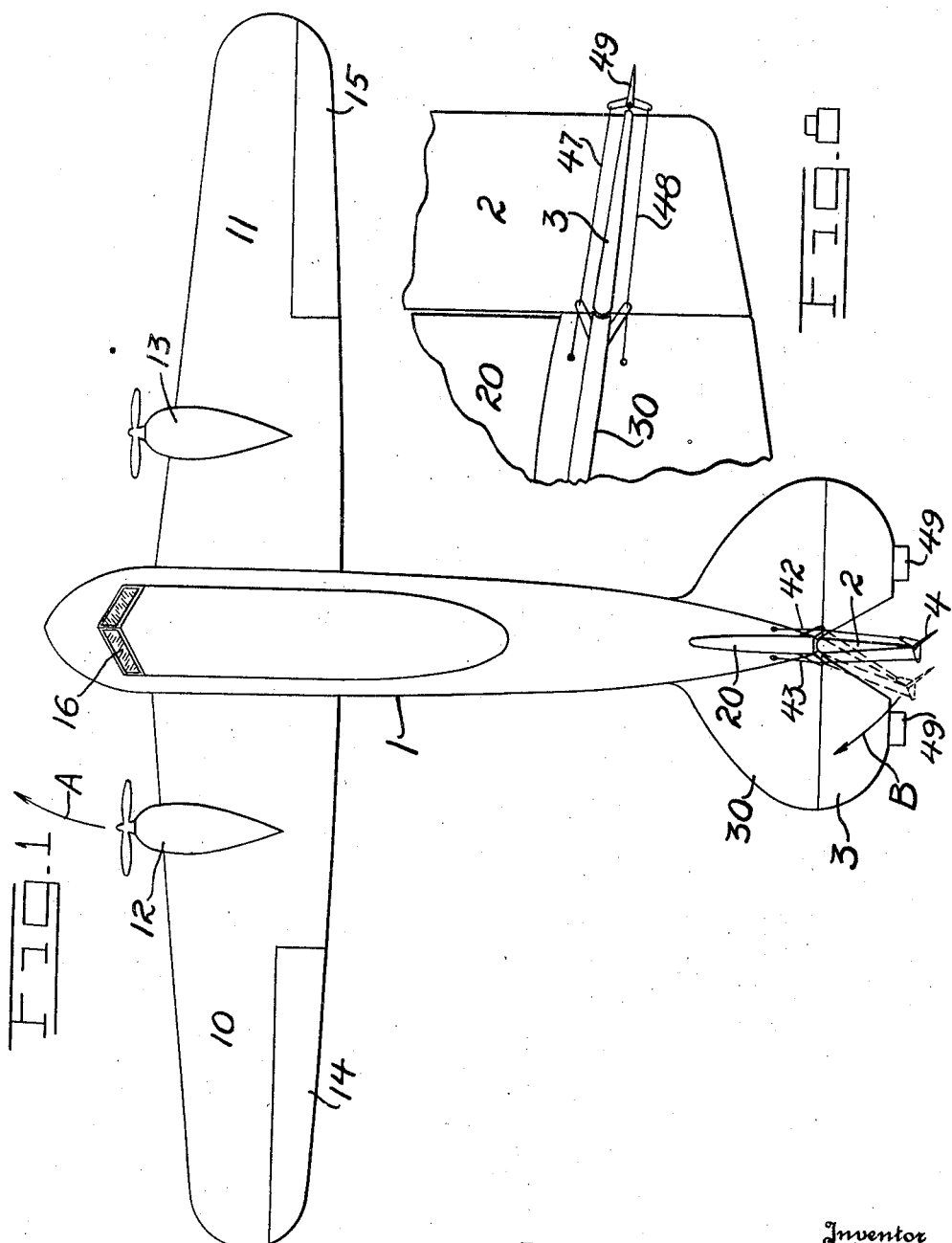
Inventor
Leslie R. Tower
By Charles L. Reynolds
Attorney

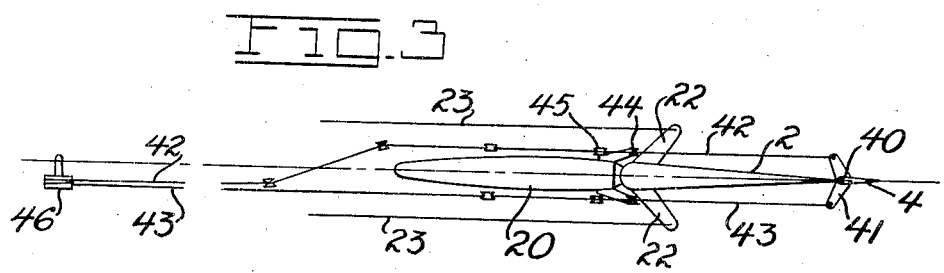
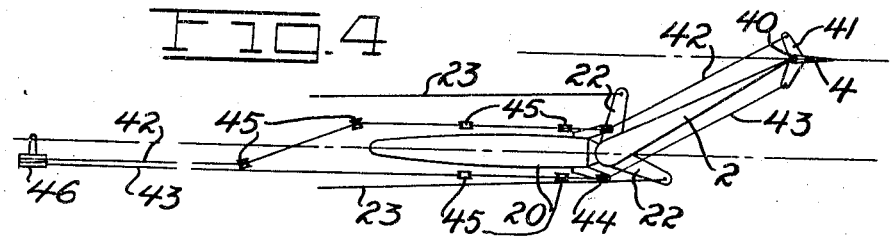
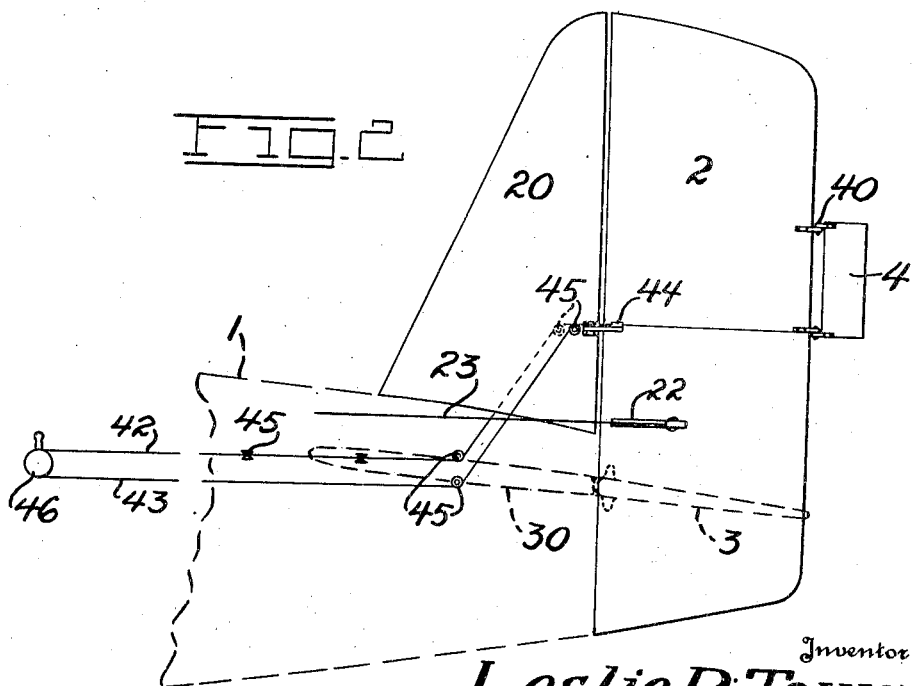

June 13, 1933.    L. R. TOWER    1,914,000
CONTROL FLAP AND BALANCE
Filed Aug. 18, 1931    3 Sheets-Sheet 3
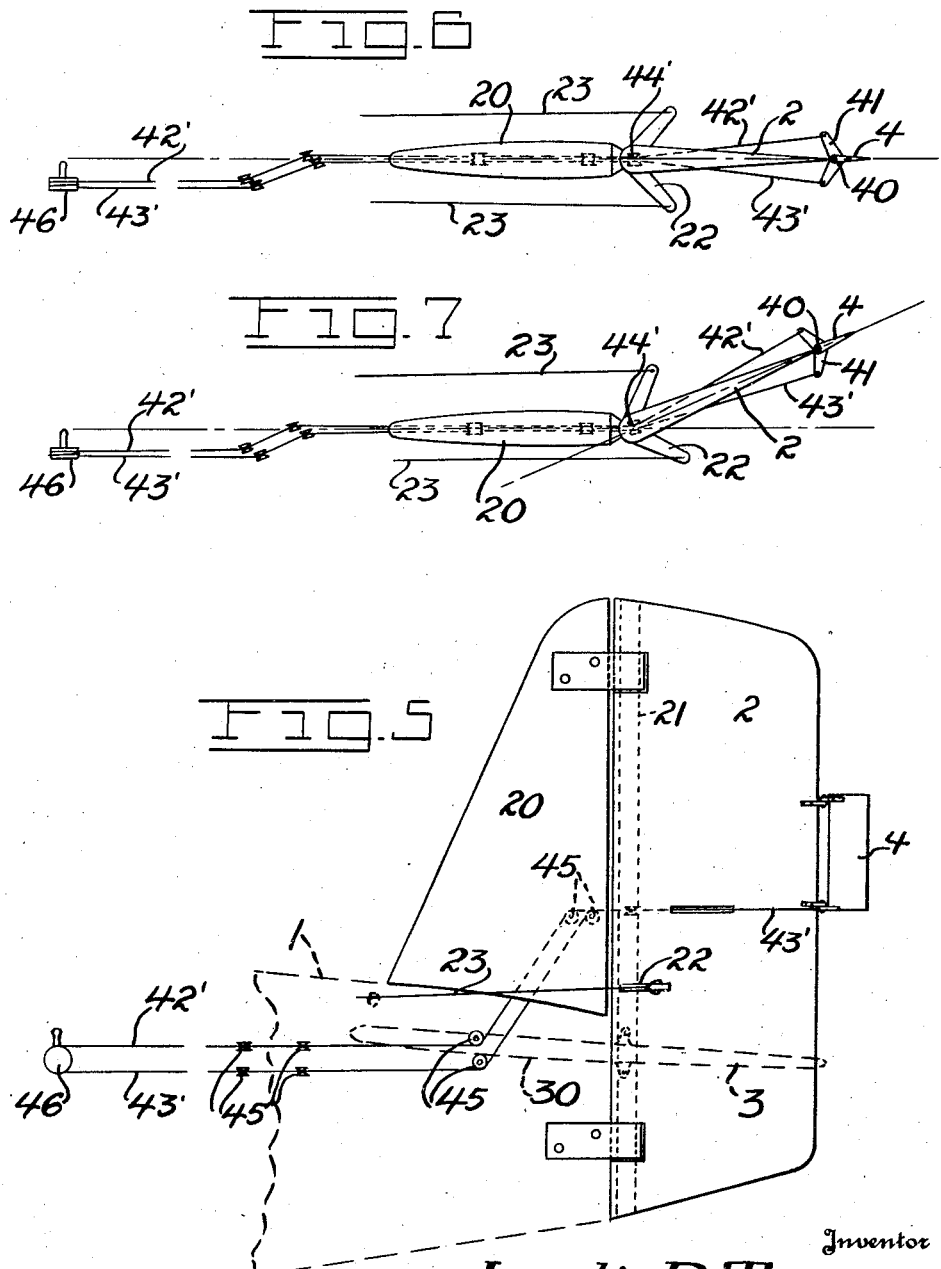

Patented June 13, 1933

1,914,000

UNITED STATES PATENT OFFICE

LESLIE R. TOWER, OF SEATTLE, WASHINGTON, ASSIGNOR TO BOEING AIRPLANE COMPANY, OF SEATTLE, WASHINGTON, A CORPORATION OF WASHINGTON

CONTROL FLAP AND BALANCE

REISSUED

Application filed August 18, 1931. Serial No. 557,830.

My invention relates to aircraft and particularly to the control surfaces thereof. By this term I intend to include the rudder, the elevator or flipper, and the ailerons, which at present comprise all the surfaces which control direction, laterally and vertically, and stability of an aircraft while in flight, as distinguished from sustaining surfaces.

It has been proposed heretofore to support an auxiliary control surface or flap, known as a Flettner balance, upon or in conjunction with a control surface (for instance, the rudder), as a means of balancing this control surface and assisting the pilot to move it more easily. However, as heretofore employed, the pilot has had no control over such a flap, and it has always been controlled, so far as I am aware, by lines arranged to maintain the flap always in position parallel to its initial position, which initial position is in the plane of the control surface when in straight-away flight. In other words, it remains always parallel to the line of flight. Located at the trailing edge, such a flap, though small, exerts a marked influence on the operation of the control surface upon which it is mounted, and renders it considerably easier to move a large control surface such as is employed upon heavy transport planes and the like. Such a balance, however, has no effect unless and until the rudder upon which it is mounted is first deflected. It cannot, per se, initiate movement, nor will it maintain the rudder deflected.

Airplanes equipped with two or more motors ordinarily have the motors balanced one against the other at opposite sides of the longitudinal axis of the craft. In the event one of these motors fails to function, the remaining motor tends to throw this side of the airplane ahead, and the pilot, at such a critical moment, is placed under the necessity of employing extreme physical effort to control the plane, since it is extremely difficult to shift the large control surfaces to counterbalance the single motor. Thus, while the plane is controllable, considerable effort is required to control it.

As a special case, illustrative of the general object hereinafter defined, it is an object of my invention to devise a means associated with the normal rudder for counteracting the unbalanced pull of an outboard motor, in a case of this sort, so that the plane may be brought under normal control and maneuvered with the customary ease for continued flight, if that be desirable to find a proper landing place, and whereby it may be brought to earth under full control, without undue physical exertion on the part of the pilot.

It is also an object to combine with such auxiliary control means a balance such as that referred to above, whereby the reg ar control surfaces will be assisted, under normal conditions of operation, in moving from one position to another without undue physical exertion on the part of the pilot, yet available at all times as an auxiliary control.

It is also an object, in another specific form of my invention, to provide a device of the character indicated, which will function solely to counteract an unbalanced force, such as the pull of a single outboard motor, without any action normally in assisting the control surfaces to move from one position to the other.

It is the general object of my invention, broadly stated, to provide a device to be associated with any of the control surfaces of an aircraft, whereby the pilot can, at will, counteract any unbalanced force tending to deflect the craft from the selected line of flight, in such a way as to leave the aircraft amenable to the controls in the usual way; in addition, and preferably, it is an object to provide such counterbalancing means which may be further and normally employed to assist in the routine control of the craft.

It is also an object to provide an auxiliary control of the general character indicated which, because of its location and manner of association with the usual tail surfaces, will permit a stronger construction of the latter, with lessened weight and fewer complications of parts.

My invention comprises broadly the provision of auxiliary control means with or without the normal balancing effect, and with whatever control surfaces it may be associated, as is shown in the accompanying drawings and more particularly defined by the claims which terminate the same.

In the accompanying drawings I have shown my invention diagrammatically in forms which illustrate the principles thereof, and as now preferred by me.

Figure 1 is a plan view of a two-motored plane illustrating the effect thereon of one motor cutting out, and the counterbalancing effect of the auxiliary control or flap.

Figure 2 is a side elevation of the rudder and vertical fin, and Figures 3 and 4 are diagrammatic views in plan, showing parts in position for normal straight-ahead flight and for a turning movement, respectively; and all illustrating one form of my invention as applied to a rudder.

Figures 5, 6 and 7 are views corresponding to Figures 2, 3 and 4, respectively, showing an alternative form of my invention operating as a control flap solely.

Figure 8 is a side elevation of the tail surfaces of a plane, showing my invention adapted for use in connection with the elevator.

In the preferred form, illustrated in Figures 1 to 4 inclusive, and 8, my invention is in effect a Flettner balance, but differing therefrom in that there are means operable from the pilot's seat by which to change the angle of the balance relative to the control surface, such as the rudder, elevator or ailerons, while in normal straight-ahead flight, so that the balance flap will cause the control surface upon which it is mounted to be deflected from its normal position in such an amount as to counteract any tendency for the craft to deviate from a straight line of flight, due to such causes, for instance, as the cutting out of one of an outboard pair of motors, which are normally balanced one against the other. It need not necessarily take such form, as may be observed in Figures 5, 6 and 7. In this latter form it does not function as a Flettner balance, but is purely and simply a control flap, and except when it is used to counterbalance an uneven application of power, it lies at all times in the plane of the control surface upon which it is mounted, and swings therewith.

The airplane of Figure 1 is purely a diagrammatic showing for purposes of illustrating the principles governing the application of my invention to an airplane. The fuselage 1 is sustained in flight by the wings 10 and 11, on which are mounted the motors 12 and 13, respectively, and lateral stability is achieved by such means as the ailerons 14 and 15 respectively. The pilot, from his compartment at 16, controls the flight of the plane, and in so doing causes movement of the elevator or flipper 3, hingedly mounted along a horizontal axis upon the horizontal stabilizer 30, and the rudder 2 hingedly mounted upon a vertical axis 31 upon the vertical fin 40. The normal controls for the movable control surfaces, for instance the rudder 2, are still employed, these being represented by the masts 22 and the cables or wires 23 running forward to the pilot's compartment (see Figures 3, 4, 6 and 7). The application of my invention in nowise interferes with these normal controls. These controls, however, are omitted in Figure 1 and Figure 8 for clearness of illustration of my invention.

Assuming a dual-motored plane to be in flight (or any aircraft having pairs of motors balanced one against the other at opposite sides of the line of flight), if one of the motors stops or fails to function properly, an unbalanced force is produced. Referring to Figure 1, should the right-hand motor 13 cut out, the plane will have a tendency, under the influence of the left-hand motor 12, to move about the plane's center of gravity to the right, as indicated by the arrow A. A control flap 4, properly associated with the rudder 2 (for instance, hinged upon the trailing edge of the rudder), and operated by a windlass 46 suitably connected to the flap and under the control of the pilot, may be immediately swung on its hinge axis, to stand at an angle to the plane of the rudder—in this instance, to the right. This produces a strong tendency to throw the rudder to the left (see arrow B), until the side thrust of the flap is counteracted by the side thrust of the rudder. The rudder, consequently, comes to rest, deflected sufficiently to counterbalance the side thrust of the operative motor 12. The plane may continue its flight, in control, until a landing may be safely effected. Of course, it is not desirable to continue in this fashion, due to the limitation on movement of the rudder to the left, but the plane is in control, and may continue its flight until a suitable landing place is found, and any landing may be effected with safety.

Such a flap may have a further normal function akin to a Flettner balance, moving automatically to remain parallel to its initial position, whether that be parallel to the line of flight or deflected therefrom, whenever there is initiated movement of the control surface, upon which it is mounted.

The flap 4, to accomplish these two ends, is pivoted upon an axis 40 upon the trailing edge and parallel to the hinge axis of a control surface (such as the rudder 2), and because of this location, the flap, though of small area, exerts considerable influence upon the control surface, and serves to balance it and cause it to swing, once deflection of the control surface has been initiated, for the reason that means are provided to maintain the flap 4 in a plane always parallel to its initial position. This has usually been accomplished by providing masts 41 upon the flap connected to similar elements 44 upon the trailing edge of the vertical fin 40, and connected thereto by cables or wires 42 and 43, whereby a parallelogram is formed, and the flap 4 is always kept in a plane parallel to its initial plane. Normally this is parallel to the line of flight of the aircraft, but if the flap has been deflected theretofore, it will remain always parallel to the adjusted position. The forward ends of the cables or wires 42 and 43 in such instances are fixed at 44. However, as will now be understood, these cables, in accordance with my invention, may or may not be fixed at this position, at the will of and at all times under the control of the pilot. To accomplish this, these cables may extend forward, the members 44 being in this instance formed as fair-leaders, and the cables are led over guide pulleys and through fair-leaders. as generally indicated at 45, to the drum or windlass 46, located in position to be controlled by the pilot.

Now the flap 4 can be fixed, under the influence of the windlass 46, in a position where, in straight-ahead flight, it lies in the same plane as the rudder 2 upon which it is mounted, and in this position it will act as the usual Flettner balance, assisting the pilot to swing the rudder during normal flight, and relieving him of the physical exertion necessary to throw the rudder to one side or the other. However, should one of the motors cut out, for instance, the motor 13 (see Figure 1), the plane will have a tendency, under the influence of the motor 12, to move about the center of gravity to the right, as indicated by the arrow A. Immediately the pilot makes adjustment of the windlass 46, throwing the flap 4 to the right, as illustrated in Figure 1, and the flap causes the rudder 2 to swing to the dotted line position of Figure 1, as indicated by the arrow B, and this immediately counteracts the tendency to swing in the direction of the arrow A, throws the rudder 2 to the left, and causes the plane to maintain a straight-ahead flight. Of course, it is not desirable to continue in this fashion, but nevertheless the plane is in normal control and may be flown without physical strain on the pilot until a suitable landing place is found, or if a landing place is available, it may be brought down under full control without the danger of a crash.

The same principles may be applied to other control surfaces than the rudder, and are so illustrated in Figures 1 and 8, whereare the auxiliary flaps 49 are shown applied in to the elevator or flipper 3, the position of this flap being controlled by cables 47 and 48 in exactly the same manner as that described for the flap 4.

One advantage of this arrangement with such a flap applied to the elevator, is that the horizontal stabilizer 30 need not be made adjustable. Such stabilizers are frequently adjustable in angle relative to the line of flight to cause the plane to nose up or down and thus to counteract varying dispositions of the load at different times. This adds weight to the tail structure and necessitates extremely strong mounting means for the adjustable stabilizer, and the employment of stout means to control the angle of the stabilizer 30. With such a control flap 49 applied to the elevator, it becomes unnecessary to adjust the stabilizer 30, and this may be made stronger because it can be permanently secured, as for instance by welding, to the tail post and the tail portion of the fuselage, and the controls therefore can be omitted. Thus weight is saved directly, and construction is simplified and made stronger, again saving weight indirectly.

In certain planes, for instance, small sport or military planes, it may not be desirable to employ such a flap as a normal balance, yet it may be desirable to have it available for use in case of an unbalanced application of power, and such an arrangement is illustrated in Figures 5, 6 and 7. The flap 4 is in all respects similar to that described, having the masts 41 and being pivotally mounted along the vertical axis 40 at the trailing edge of the rudder 2, for instance. The cables 42' and 43' extend forwardly, but in this instance extend through a fair-leader 44', which lies in the pivot axis 21 of the rudder 2. Thence these cables extend forwardly as before over fair-leaders and pulleys 45 to the windlass 46. In this arrangement, because the cables 42' and 43' extend through the pivot axis of the rudder, the flap 4 swings with the rudder and does not change its angle with relation thereto, except as it is changed by manipulation of the windlass 46. Upon moving the windlass, however, the angle of the control flap, relative to the plane of the rudder and the line of flight, is varied, and the flap functions as previously described to counterbalance an unbalanced force.

What I claim as my invention is:

1. In combination with an aircraft, a control surface thereon adjustable relative to the line of flight, means controllable by the pilot so to adjust said control surface, a control flap mounted substantially at the trailing edge of the control surface, and adjustable relative to the plane of the control surface, means independent of the control surface controls to adjust the flap initially relative to the surface and the line of flight, and means to maintain the flap, for all positions of the control surface, at the adjusted angle relative to the control surface's plane.

2. In combination with an aircraft including a fuselage, a control surface pivotally mounted upon the aircraft and adjustable relative to the line of flight, means controllable by the pilot so to adjust the control surface, a control flap mounted upon the control surface and adjustable relative to the plane of the control surface, and means independent of the control surface controls, and operable from the fuselage in flight to adjust the flap relative to the control surface and line of flight, said means including tension members passing through the pivot axis of the control surface.

3. In combination with an aircraft and pairs of motors balanced at opposite sides of the aircraft's longitudinal axis, a vertical rudder, a control flap pivotally mounted upon the rudder in immediate prolongation of the plane of the rudder, and adjustable relative to such plane, means to adjust the flap relative to the rudder and the line of flight, independent means to swing the rudder, and means to maintain the flap for all positions of the rudder, at such adjusted angle to the latter's plane.

4. In combination with a pivotally mounted control surface of an airplane, means controllable by the pilot to swing the same, a balance flap pivoted substantially at the trailing edge thereof, masts projecting oppositely from said flap, a line extending from each mast forward, guides for said lines disposed in the pivot axis of the control surface, and means for taking in or paying out said lines, independently of the movement of the control surface to adjust the flap angularly relative to the control surface.

5. In combination with a pivotally mounted aircraft control surface, means connected to said control surface to swing the same on its pivot, an auxiliary control flap journaled on the rear portion of said control surface, operating means independent of the control surface swinging means, to swing said auxiliary flap relative to said control surface to establish a desired angular relation between said flap and said control surface, and means to maintain such angular relationship of the flap and control surface for all positions of swing of such control surface, without further adjustment of said operating means.

6. In combination with an airplane structure, a tail surface pivotally mounted thereon, a balance flap pivoted substantially at the trailing edge of said tail surface, masts projecting oppositely from said flap, a line extending from each mast forward, guides for said lines fixed relative to the airplane structure, and disposed adjacent the pivot of the tail surface, at a distance therefrom at each side equal to the distance of the masts from the pivot of the flap, and means for taking in or paying out said lines to adjust the flap angularly relative to the control surface.

7. In combination with an aircraft structure, a control surface pivotally mounted thereon, control means operable by the pilot for swinging the same, a balance flap pivotally supported on the rear portion of said control surface, control means independent of said first control means to actuate said balance flap, and a continuous two part cable disposed at opposite sides of the control surface, and secured only to and between said balance flap and said second control means, and guide means associated with the control surface pivot and fixed relative thereto for all positions of said balance flap or control surface, to receive the cable and to maintain the two parts thereof in predetermined relation to the control surface for all positions of such control surface.

8. In combination with an aircraft structure, a control surface pivotally mounted thereon, control means operable by the pilot for swinging the same, a balance flap pivotally supported on the rear portion of said control surface, control means independent of said first control means to actuate said balance flap, and a continuous two part cable disposed at opposite sides of the control surface, and secured only to and between said balance flap and said second control means, and guide means rigidly mounted on said aircraft structure disposed on each side of the control surface pivot, to receive the cable and to maintain the two parts thereof in spaced parallel relation between said guide means and said balance flap.

9. In combination with an aircraft structure, an adjustable tail surface mounted thereon, a balance flap mounted on said tail surface, adjusting means to vary the angle of said flap relative to the plane of the tail surface from a distance, and means cooperating with said adjusting means to maintain the flap for any one selected position of the adjusting means, at a constant angle relative to the flight path for all adjusted positions of the tail surface.

10. In combination with the fuselage of an airplane, a tail surface non-adjustably mounted on the fuselage, a pivotally mounted tail surface swingable relative to said non-adjustable surface, means so to swing said pivotally mounted tail surface at will, a control flap mounted on and swingable relative to the pivoted tail surface, means independent of the first means to dispose the flap in a plurality of angularly adjusted positions relative to said non-adjustable tail surface, and means independent of said second means to maintain the flap in any selected adjusted position, for all angular positions of the adjustable tail surface, relative to said non-adjustable tail surface.

11. In combination with an aircraft, a control surface pivotally mounted thereon and adjustable relative to the line of flight, means controllable by the pilot so to adjust said control surface, a control flap mounted substantially at the trailing edge of the control surface, and adjustable relative to the plane of the control surface, means independent of the control surface controls to adjust the flap initially relative to the surface and the line of flight, said means being disposed and arranged, relative to the pivot axis of the control surface, to maintain the flap, for all positions of the control surface, at the adjusted angle to the control surface.

12. In combination with an airplane structure, a tail surface pivotally mounted thereon, control means operable by the pilot for swinging the same, a balance flap pivoted substantially at the trailing edge of said tail surface, masts projecting oppositely from said flap, a line extending from each mast forward, guides for said lines extending through the pivot axis of the tail surface, and means independent of the first control means for taking in or paying out said lines to adjust the flap angularly relative to the control surface.

Signed at Seattle, King County, Washington, this 14th day of August, 1931.

LESLIE R. TOWER.